Patented June 23, 1925.

1,543,570

UNITED STATES PATENT OFFICE.

JOSÉ B. ILLAS, OF HABANA, CUBA.

PROCESS OF MANUFACTURING ARTIFICIAL TURPENTINE.

No Drawing. Application filed February 24, 1923. Serial No. 621,096.

*To all whom it may concern:*

Be it known that I, José B. Illas, a citizen of the Republic of Cuba, and resident of Habana, Cuba, have invented certain new and useful Improvements in the Process of Manufacturing Artificial Turpentine, of which the following is a specification.

This invention relates to the manufacture of the so-called artificial turpentine, that is to say a product which is suitable to be used as a substitute for turpentine spirit.

An object of this invention is to provide an improved process for the manufacture of the so-called artificial turpentine, by using as a base refined petroleum, and depriving same of its grease in an efficient manner so as to obtain a product which is efficient as a drier.

Another object of the invention is to add to the refined petroleum once deprived of its grease, certain named ingredients having drying qualities and which can be obtained at economical prices.

Heretofore the procedure for depriving the petroleum of its grease has been by adding thereto calcium carbide, permitting the mixture to rest and filtering, but the scouring was not as efficient as was necessary to obtain a highly efficient drier and besides the resulting product lacked that particular odor which should characterize a product of this class in commercial uses.

It is for this reason that I have invented an improved process for making the so-called artificial turpentine, which comprises first treating the refined petroleum with calcium carbide, in the proportion of four per cent of the quantity of petroleum, adding to the mixture potash and water acidulated with muriatic acid in a proportion of about 8 to 10 per cent of the quantity of petroleum. The mixture is stirred up and permitted to rest a short time, say from one to two hours approximately, after which time the petroleum is drawn off from the water containing the residues of the mixture, which operation is easily done owing to the different density of the liquids, and the petroleum is filtered. Then the same scouring operation is repeated with the filtered petroleum, that is, adding again calcium carbide, potash and water acidulated with muriatic acid, permitting rest, drawing off and filtering, and this operation is repeated once more, but this time there is added to the filtered mixture calcium carbide, potash and acidulated water, the mixture permitted to rest and drawn off, and to the resulting product is added pine oil alone or mixed with turpentine spirit, as it may be desired, to obtain respectively a product of lower or higher quality, the latter products being added in a proportion which varies from 20 to 30% of the quantity of petroleum, after which the mixture is filtered, thus obtaining a very pure product and of the best possible drying qualities.

I do not desire to be limited to the proportions of the ingredients nor to the exact manner of proceeding as set forth, but what I claim is:

1. An improved process of manufacturing artificial turpentine, which consists in treating refined petroleum with calcium carbide, adding an alkali and water acidulated with muriatic acid, permitting the mixture to rest, drawing off the petroleum and filtering it, repeating these operations twice and adding to the product the second time and before filtering, pine oil.

2. An improved process of manufacturing artificial turpentine, which consists in treating refined petroleum with calcium carbide, adding an alkali and water acidulated with muriatic acid, permitting the mixture to rest, drawing off and filtering the petroleum, repeating these operations twice, and adding to the product the second time and before filtering, pine oil and turpentine spirit.

3. An improved process of manufacturing artificial turpentine, which consists in treating refined petroleum with calcium carbide, adding potash and water acidulated with muriatic acid, permitting the mixture to rest, drawing off the petroleum from the water part and filtering the petroleum, repeating these operations twice and adding to the petroleum the second time and before filtering pine oil and turpentine spirit.

In witness whereof I affix my signature.

JOSÉ B. ILLAS.